(12) United States Patent
Chari et al.

(10) Patent No.: US 7,119,859 B2
(45) Date of Patent: Oct. 10, 2006

(54) CONTRAST CHIRAL NEMATIC LIQUID CRYSTAL DISPLAYS

(75) Inventors: Krishnan Chari, Fairport, NY (US); Charles M. Rankin, Jr., Penfield, NY (US); Thomas R. Welter, Webster, NY (US)

(73) Assignee: Eastman Kodak Cimpany, Rochester, NY (US)

( * ) Notice: Subject to any disclaimer, the term of this patent is extended or adjusted under 35 U.S.C. 154(b) by 0 days.

(21) Appl. No.: 10/860,973

(22) Filed: Jun. 4, 2004

(65) Prior Publication Data

US 2005/0270441 A1 Dec. 8, 2005

(51) Int. Cl.
*G02F 1/1333* (2006.01)
(52) U.S. Cl. .................................................. 349/88
(58) Field of Classification Search ................. None
See application file for complete search history.

(56) References Cited

U.S. PATENT DOCUMENTS

| | | | | |
|---|---|---|---|---|
| 3,578,844 A | * | 5/1971 | Churchill et al. | 349/21 |
| 3,585,381 A | * | 6/1971 | Hodson et al. | 349/21 |
| 3,600,060 A | * | 8/1971 | Churchill et al. | 349/21 |
| 3,734,597 A | * | 5/1973 | Churchill et al. | 349/86 |
| 4,140,016 A | | 2/1979 | Fergason | |
| 4,288,147 A | | 9/1981 | Koch | |
| 4,435,047 A | | 3/1984 | Fergason | |
| 4,688,900 A | | 8/1987 | Doane et al. | |
| 4,884,873 A | * | 12/1989 | Fergason | 349/86 |
| 4,935,160 A | | 6/1990 | Scheuble et al. | |
| 5,084,203 A | * | 1/1992 | Sansone et al. | 252/299.5 |
| 5,124,819 A | * | 6/1992 | Davis | 349/199 |
| 5,363,482 A | | 11/1994 | Victor et al. | |
| 5,473,448 A | * | 12/1995 | Yoshinaga et al. | 349/89 |
| 5,514,504 A | * | 5/1996 | Iijima et al. | 430/20 |
| 5,579,135 A | * | 11/1996 | Kajiyama et al. | 349/89 |
| 5,585,035 A | * | 12/1996 | Nerad et al. | 252/299.01 |
| 5,620,630 A | * | 4/1997 | Onishi et al. | 264/1.36 |
| 5,958,291 A | * | 9/1999 | Naito et al. | 252/299.1 |
| 6,221,443 B1 | * | 4/2001 | Kubota et al. | 428/1.1 |
| 6,278,505 B1 | | 8/2001 | Okada et al. | |
| 6,320,631 B1 | | 11/2001 | Okada et al. | |
| 6,423,368 B1 | | 7/2002 | Stephenson et al. | |
| 6,433,843 B1 | | 8/2002 | Okada et al. | |
| 6,549,261 B1 | | 4/2003 | Okada et al. | |

OTHER PUBLICATIONS

Drzaic, P.S. in Liquid Crystal Dispersions published by World Scientific, Singapore (1995).
Whitesides and Ross (J. Colloid Interface Sci. 169, 48 (1995)).
Giermanska-Kahn, Schmitt, Binks and Leal-Calderon (Langmuir, 18, 2515 (2002)).
U.S. Appl. No. 10/718,900, Chari et al., "Reflective Chiral-Nematic Liquid Crystal Display with Broadband Reflection", filed Nov. 21, 2003.

* cited by examiner

*Primary Examiner*—James A. Dudek
(74) *Attorney, Agent, or Firm*—Lynne M. Blank

(57) ABSTRACT

The present invention relates to a bistable polymer dispersed liquid crystal display comprising a support, at least one patterned first conductor layer having thereon at least one dried imaging layer comprising a substantial monolayer of isolated domains of liquid crystal material dispersed in a continuous polymer matrix, wherein said dried imaging layer further comprises at least one absorber colorant, and wherein said isolated domains have a size distribution such that the coefficient of variation (cv) is less than 0.35.

38 Claims, 3 Drawing Sheets

CONTRAST CHIRAL NEMATIC LIQUID CRYSTAL DISPLAYS

FIELD OF THE INVENTION

The present invention relates to a display sheet having a chiral nematic liquid crystal layer containing a colorant to provide a relatively lighter (brighter) state and a relatively darker state.

BACKGROUND OF THE INVENTION

There are two main methods for fabricating polymer dispersed liquid crystal devices, also referred to herein as PDLC devices: emulsion methods and phase separation methods. Emulsion methods have been described in U.S. Pat. Nos. 4,435,047 and 5,363,482. The liquid crystal is mixed with an aqueous solution containing binder. The liquid crystal is insoluble in the continuous phase and an oil-in-water emulsion is formed when the composition is passed through a suitable shearing device, such as a homogenizer. The emulsion is coated on a conductive surface and the water allowed to evaporate. A second conductive surface may then be placed on top of the emulsion layer by lamination, vacuum deposition, or screen printing to form a device. While the emulsion methods are straightforward to implement, droplet size distributions tend to be broad resulting in a loss in performance. For cholesteric liquid crystal devices, also referred to herein as CLC devices, this typically means reduced contrast and brightness. Phase separation methods were introduced in an effort to overcome this difficulty.

Phase separation methods have been outlined in U.S. Pat. No. 4,688,900 and in Drzaic, P. S. in Liquid Crystal Dispersions, pgs. 30–51, published by World Scientific, Singapore (1995). The liquid crystal and polymer, or precursor to the polymer, are dissolved in a common organic solvent. The composition is then coated on a conductive surface and induced to phase separate by application of ultraviolet (UV) radiation or by the application of heat or by evaporation of the solvent, resulting in droplets of liquid crystal in a solid polymer matrix. A device may then be constructed utilizing this composition. Although phase separation methods produce dispersed droplets having more uniform size distributions, there are numerous problems with this approach. For example, the long term photostability of photopolymerized systems is a concern due to the presence of photoinitiators that produce reactive free radicals. Photoinitiators not consumed by the polymerization process can continue to produce free radicals that can degrade the polymer and liquid crystals over time. Furthermore, it is also known that UV radiation is harmful to liquid crystals. Specifically, exposure to UV radiation can lead to decomposition of the chrial dopant in a cholesteric liquid crystal mixture, resulting in a change in the reflected color. The use of organic solvents may also be objectionable in certain manufacturing environments.

U.S. Pat. No. 6,423,368 proposes to overcome the problems associated with the prior art methods through the use of droplets of the liquid crystal material prepared using a limited coalescence process. In this process, the droplet-water interface is stabilized by particulate species, such as colloidal silica. Surface stabilization by particulate species such as colloidal silica is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides significant improvement in brightness and contrast over prior art processes. It also overcomes some of the problems associated with photoinitators and UV radiation.

U.S. patent application Ser. No. 10/718,900 shows that the maximum contrast in a bistable cholesteric liquid crystal mixture display prepared by the limited coalescence method is obtained when the uniform liquid crystal domains or droplets are coated as substantially a monolayer on the first conductive support. The bistable states in these cholesteric liquid crystal mixture displays are the planar reflecting state and the weakly scattering focal conic state. Back-scattering of light from the weakly scattering focal conic state increases drastically when there is more than a monolayer of droplets between the conductive surfaces. While the method provides displays with good brightness and contrast, there is still a need for further improvement in the appearance of the display. Specifically, there is a need to eliminate or reduce significantly the back-scattering of light at the lower end of wavelengths in the visible spectrum. Furthermore, there is a need to improve color purity in a PDLC type cholesteric liquid crystal mixture device. It is well known that the shape of the droplet causes reflections in the planar state at wavelengths lower than the main band, giving rise to a loss in color purity.

U.S. Pat. No. 6,278,505 teaches a method for improving contrast and color purity of a PDLC type cholesteric liquid crystal mixture device by adding a coloring agent to either the liquid crystal medium or to the binder. The coloring agent is chosen to absorb light in a wavelength range different from the main reflection band of the cholesteric liquid crystal mixture material. However, Okada et al. also teach fabricating a PDLC device by a phase separation process that uses UV radiation to photo-cure the binder. The process suffers from the disadvantage that numerous coloring agents, such as color dyes, are extremely sensitive to UV radiation and the presence of reactive free radicals, produced by UV irradiation.

Problem to be Solved

There remains a need for a display sheet having a chiral nematic liquid crystal layer and, in particular, a bistable polymer dispersed liquid crystal display sheet, which has improved contrast because of reduced scattering properties of the focal conic state and more saturated reflected color from the planar state.

SUMMARY OF THE INVENTION

The present invention relates to a bistable polymer dispersed liquid crystal display comprising a support, at least one patterned first conductor layer having thereon at least one dried imaging layer comprising a substantial monolayer of isolated domains of liquid crystal material dispersed in a continuous polymer matrix, wherein the dried imaging layer further comprises at least one absorber colorant, and wherein the isolated domains have a size distribution such that the coefficient of variation (cv) is less than 0.35.

Advantageous Effect of the Invention

The present invention includes several advantages, not all of which are incorporated in a single embodiment. The displays based on chiral nematic materials of the invention demonstrate substantial improvement in the contrast and in the purity of its reflected color.

DETAILED DESCRIPTION OF THE INVENTION

The present invention relates to a bistable polymer dispersed liquid crystal display comprising a support, at least one patterned first conductor layer and at least one dried imaging layer comprising a substantial monolayer of isolated domains of liquid crystal material having a size distribution such that the coefficient of variation (cv) is less than 0.35 which are dispersed in a continuous polymer matrix with at least one absorber colorant. In a preferred embodiment, the present invention relates to a display sheet having a chiral nematic liquid crystal (CLC) layer that can change states, a relatively lighter (brighter) state and a relatively darker state, to provide a viewable image. In particular, the invention relates to a bistable polymer dispersed liquid crystal display sheet with improved contrast and color purity. The display sheet has a layer containing a substantial monolayer of isolated domains of liquid crystal material and at least one absorber colorant dispersed in a continuous, initially water soluble, matrix, in contact with at least one conductor and carried on a substrate.

Improvement in contrast is obtained by adding a small amount of light absorbing colorant, preferably an absorber dye, to the chiral nematic formulation. It is preferred that an absorbing dye is used to selectively absorb back scattered light from the focal conic state at the lowest wavelengths in the visible part of the spectrum. Further, the colorant selectively absorbs similarly scattered light from the planar state, while only minimally absorbing the main body of reflected light.

Figure 1:
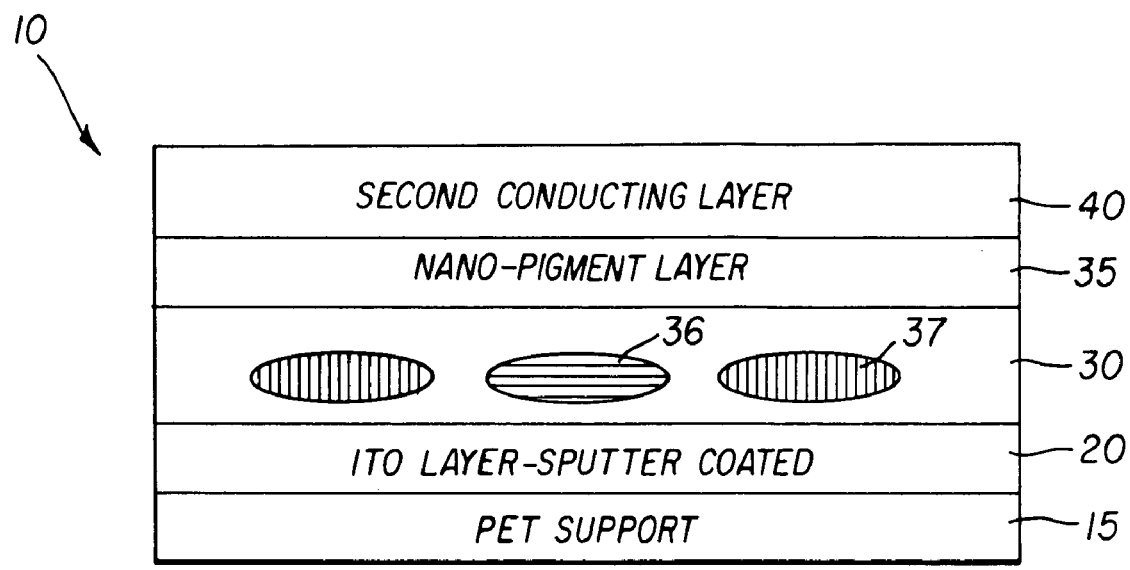
FIG. 1 is a diagram of a display device in accordance with the present invention.

A liquid crystal display (LCD) is a type of flat panel display used in various electronic devices. At a minimum, a liquid crystal display comprises a substrate, at least one conductive layer and a liquid crystal layer. Liquid crystal displays may also comprise two sheets of polarizing material with a liquid crystal solution between the polarizing sheets. The sheets of polarizing material may comprise a substrate of glass or transparent plastic. The liquid crystal display may also include functional layers. In one embodiment of a liquid crystal display, illustrated in FIG. 1, a transparent, multilayer flexible support 15 is coated with a first conductive layer 20, which may be patterned, onto which is coated the light modulating liquid crystal layer 30. A second conductive layer 40 is applied and overcoated with a dielectric layer 42 to which dielectric conductive row contacts 44 are attached, including via 43 that permit interconnection between conductive layers and the dielectric conductive row contacts. An optional nanopigmented functional layer may be applied between the liquid crystal layer 30 and the second conductive layer 40.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state Liquid crystals can be nematic (N), chiral nematic (N*), or smectic, depending upon the arrangement of the molecules in the mesophase. A twisted nematic cell is made up of two bounding plates, each with a transparent conductive coating that acts as an electrode, spacers to control the cell gap, two cross polarizers, one of which is referred to as the polarizer and the other as the analyzer, and nematic liquid crystal material. Twisted nematic displays rotate the direction of the liquid crystal by 90°. Super-twisted nematic displays employ up to a 270° rotation. This extra rotation gives the crystal a much deeper voltage-brightness response, and also widens the angle at which the display can be viewed before losing much contrast. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field. The two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state, the helical axes of the liquid crystal molecules are generally randomly oriented. Adjusting the concentration of chiral dopants in the chiral nematic material modulates the pitch length of the mesophase and, thus, the wavelength of reflected radiation. Chiral nematic materials that reflect infrared radiation and ultraviolet have been used for purposes of scientific study. Commercial displays are most often fabricated from chiral nematic materials that reflect visible light. Some known liquid crystal displays include chemically etched, transparent, conductive layers overlying a glass substrate as described in U.S. Pat. No. 5,667,853, incorporated herein by reference.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z-R" wherein X and Z, which may be identical or different, are in each case, independently from one another, a bivalent radical from the group formed by -Phe-, -Cyc-, -Phe—Phe-, -Phe-Cyc-, -Cyc—Cyc-, -Pyr-, -Dio-, -B-Phe- and -B-Cyc-; wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH=CH—, —C≡C—, —N=N (O)—, —CH=CY'—, —CH=N(O)—, —CH2—CH2—, —CO—O—, —CH2—O—, —CO—S—, —CH2—S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100. TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein. Typical well known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 by T. Welter et al., filed Aug. 29, 2003, titled "Chiral Compounds And Compositions Containing The Same," hereby incorporated by reference.

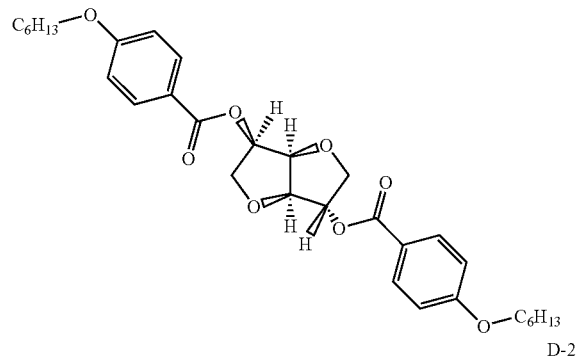

D-1

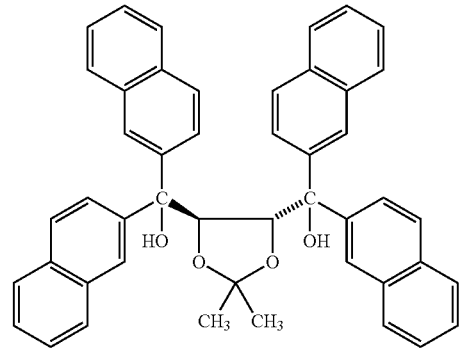

D-2

-continued

D-3

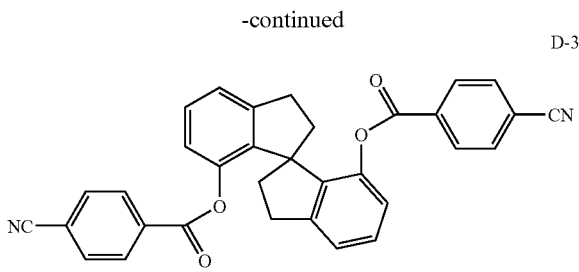

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP (as termed β in some references) is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand-held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, Ser. No. 07/969,093; Ser. No. 08/057,662; Yang et al., Appl. Phys. Lett. 60(25) pp 3102–04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

One or more colorant, typically dyes, may be incorporated in the cholesteric liquid crystal materials or binder or both. The colorants may be selected from various kinds of known coloring agent, which absorb light in a wavelength range that is different from the wavelength range covered by the reflection bands of the cholesteric liquid crystal materials. The colorants may include both dyes and pigments. The colorant may absorb light components, which may cause turbidity of color in the color display performed by selective reflection of the liquid crystal or may cause lowering of a transparency in the non-reflecting state of the liquid crystal, and therefore can improve the display quality. Two or more of the components in the liquid crystal display may contain a coloring agent. For example, both the polymer and the liquid crystal may contain the coloring agent. Preferably, a colorant is selected, which absorbs rays in a range of shorter wavelengths than the selective reflection wavelength of the liquid crystal.

Figure 2:
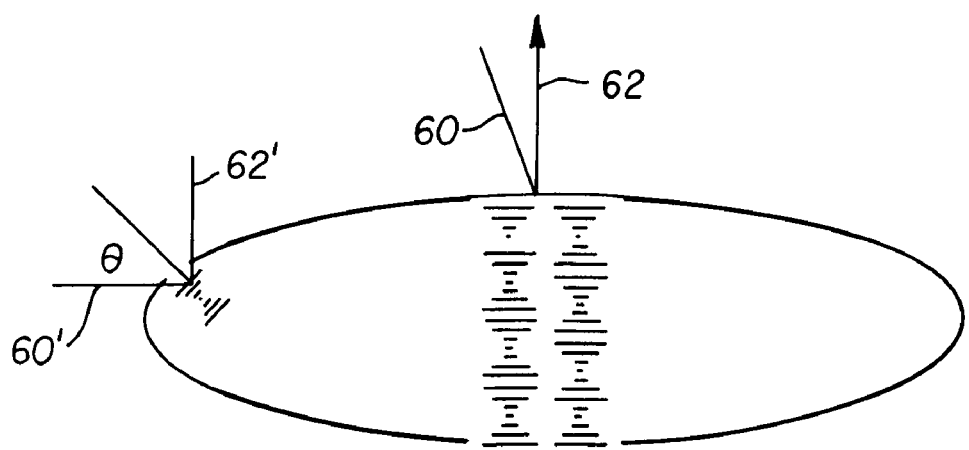
FIG. 2 is a sectional view of a domain containing chiral-nematic liquid crystal material in a planar or reflecting state.

As shown in FIG. 2, the curvature of a coated droplet of CLC material results in broadening of the spectrum of reflected light because of the Bragg reflection condition $$\lambda_{max} = n_{av} p_0 \cos \theta$$

where θ is the angle between the incident light and the normal to the surface of the droplet. In the center of the droplet, the angle between the incident light 60 and the normal to the surface is zero and therefore, $\lambda_{max} = n_{av} p_0$ for the reflected light 62. However, towards the edge of the droplet, θ is much greater than zero and cos θ is less than unity. Therefore, Bragg reflected light from the edge of the droplet will be of shorter wavelength compared to that from the center of the droplet leading to spectral broadening and a loss of color purity. It is clear that the broadening will be more apparent for droplets containing CLC materials that reflect at longer wavelengths such as green or red. In such cases it is desirable to add a blue or cyan absorbing colorant to the CLC material. The latter may be a mixture of several colorants which, when added to the CLC material, have absorption in the cyan or minus red part of the visible spectrum so that a purer reflected red is obtained. Colorants, which only slightly absorb light in the selective reflection wavelength range of the liquid crystal, may be used, provided that the colorant sufficiently absorbs the spectral rays in a wavelength range different from the selective reflection wavelength range of the liquid crystal material.

Any amount of colorant may be used, provided that addition of the colorant does not remarkably impair the switching characteristics of the liquid crystal material for display. In addition, if the polymeric binder is formed by polymerization, the addition does not inhibit the polymerization. An exemplary amount of colorant is from at least 0.1 weight % to 5 weight % of the liquid crystal material.

In a preferred embodiment, the colorants, preferably absorber dyes, are incorporated directly in the CLC materials. Any colorants that are miscible with the cholesteric liquid crystal materials are useful for this purpose. Most preferred are colorants that are readily soluble in toluene. By readily soluble is meant preferably a solubility greater than 1 gram per liter, more preferably greater than 10 grams per liter and most preferably greater than 100 grams per liter. The inventors have determined that toluene soluble dyes are most compatible with the cholesteric liquid crystal materials. Suitable colorants are anthraquinone dyes such as Sandoplast Blue 2B from Clariant Corporation, phthalocyanine dyes such as Savinyl Blue GLS from Clariant Corporation or Neozapon Blue 807 from BASF Corporation, methine dyes such as Sandoplast Yellow 3G from Clariant Corporation or metal complex dyes such as Neozapon Yellow 157, Neozapon Orange 251, Neozapon Green 975, Neozapon Blue 807 or Neozapon Red 365 from BASF Corporation. Other colorants are Neopen Blue 808, Neopen Yellow 075, Sudan Orange 220 or Sudan Blue 670 from BASF Corporation. Other types of colorants may include various kinds of dyestuff such as dyestuff for resin coloring and dichromatic dyestuff for liquid crystal display. The dyestuff for resin coloring may be SPR RED1 (manufactured by Mitsui Toatsu Senryo Co., Ltd.). The dichromatic dyestuff for liquid crystal is specifically SI-424 or M-483 (both manufactured by Mitsui Toatsu Senryo Co., Ltd.). Particularly preferred are absorber dyes that absorb in a wavelength range 350 to 450 nm. In one preferred embodiment, the absorber colorant comprises a blue absorber dye. In a related embodiment, the absorber colorant comprises a blue absorber dye and the liquid crystal material is a green, yellow, orange or red reflecting liquid crystal material. In another preferred embodiment, the absorber dye comprises a mixture of green and blue absorber dye. In a related embodiment, the absorber dye comprises a mixture of green and blue absorber dye and the liquid crystal material is a red reflecting liquid crystal material. In yet another embodiment, the absorber colorant comprises a green absorber dye. In a related embodiment, the absorber colorant comprises a green absorber dye and the liquid crystal material is a blue or red reflecting liquid crystal material. In still another embodiment, the absorber colorant comprises a red absorber dye. In still another related embodiment, the liquid crystal material is a blue or green reflecting liquid crystal material.

Still other dyes suitable for use in our invention are listed below.

013931-8
YD-1

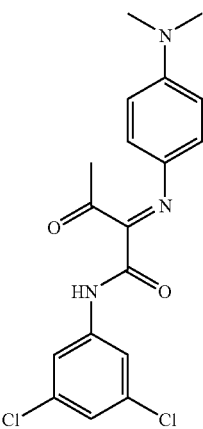

018847-3
YD-2

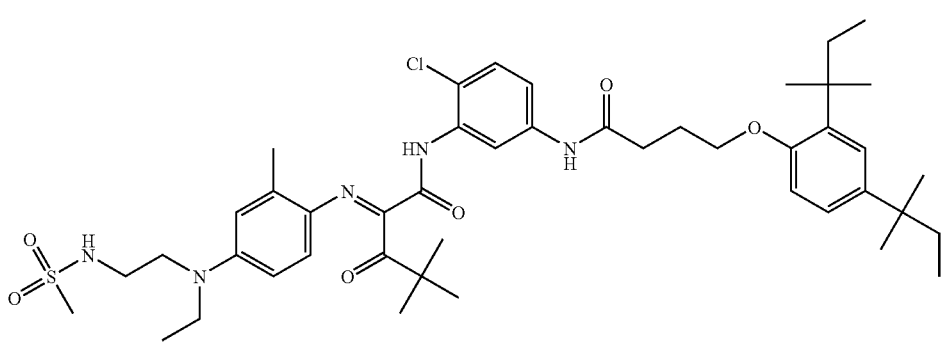

030900-9
YD-3
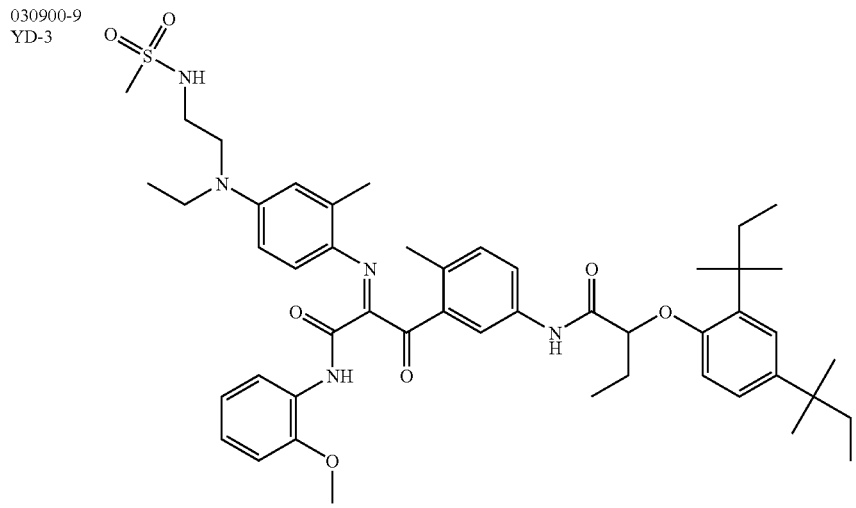
031185-0
YD-4
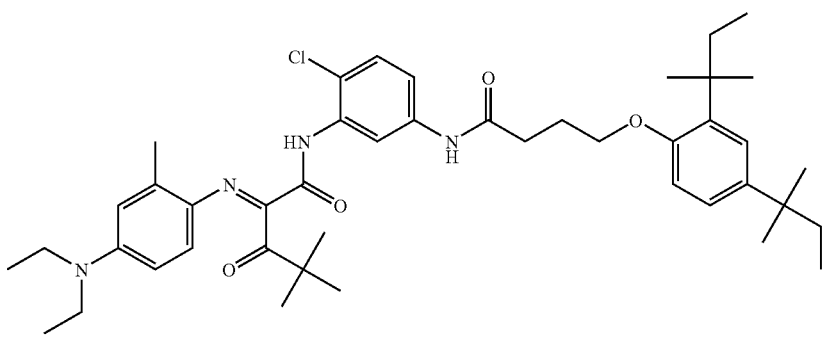
035673-7
YD-5
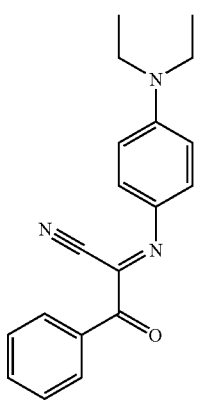
093688-6
YD-6
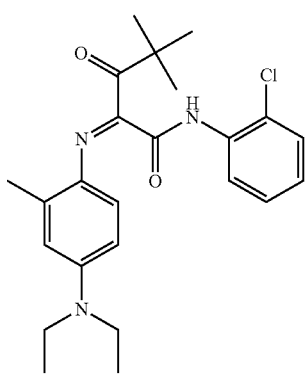

149932-4
YD-7
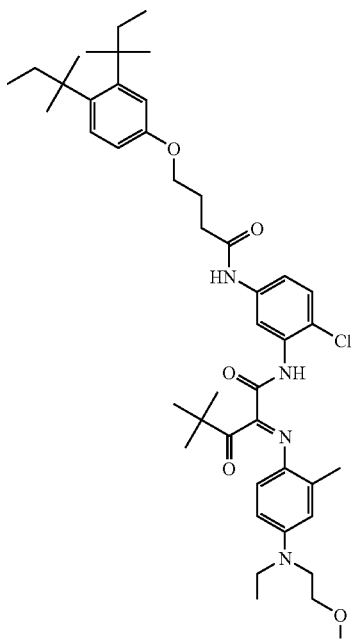
150024-6
YD-8
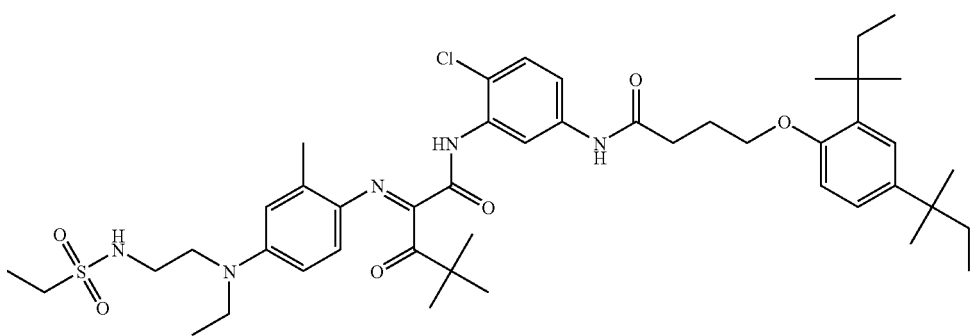
150266-2
YD-9
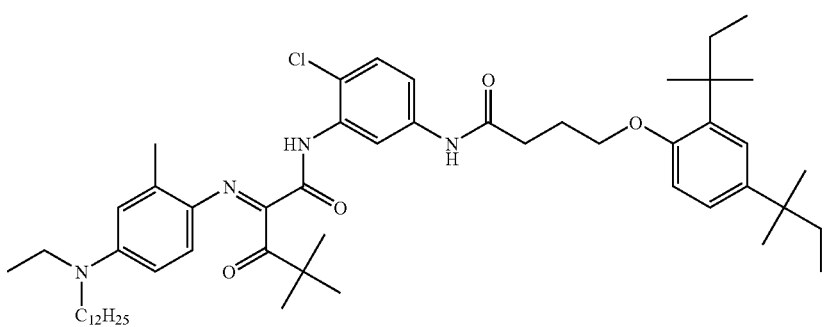

-continued
223973-5
YD-10
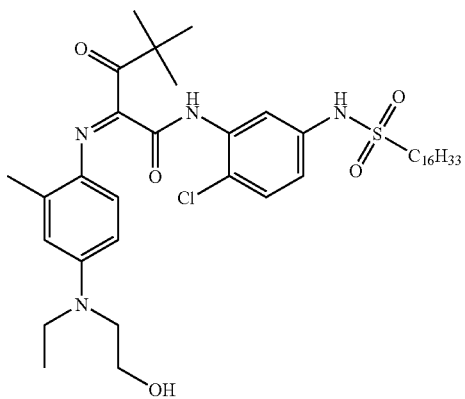
225631-4
YD-11
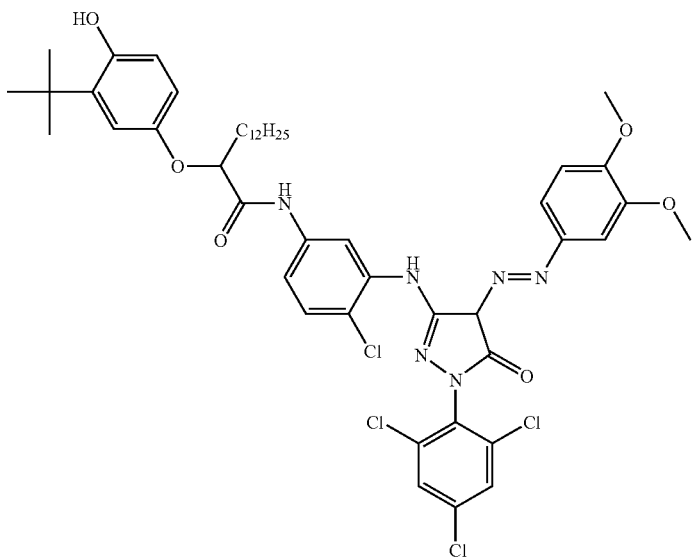
226869-8
YD-12
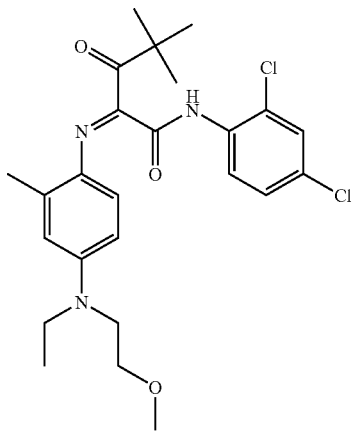

-continued
226870-1
YD-13
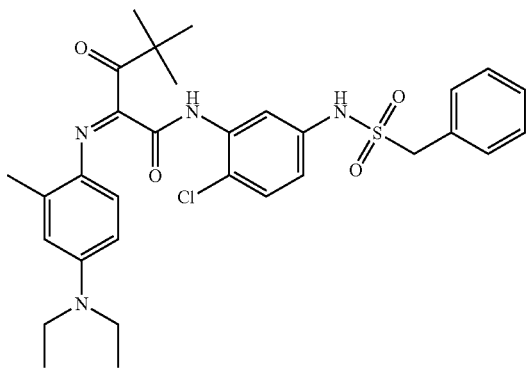
226871-2
YD-14
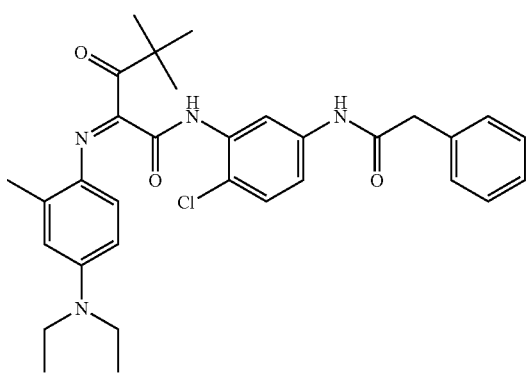
226872-3
YD-15
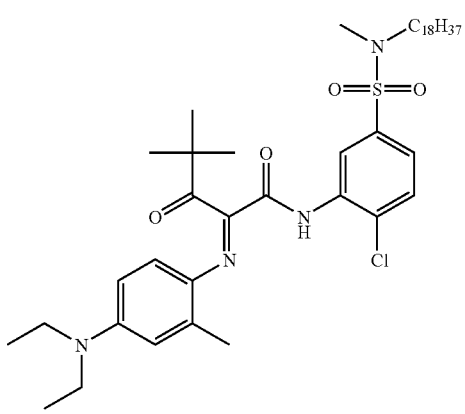
229417-6
YD-16
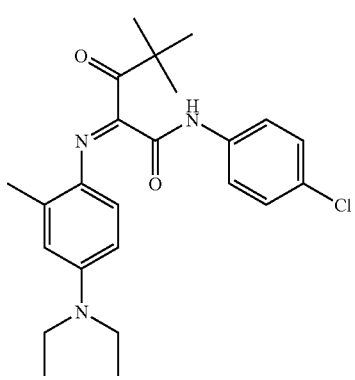

-continued
229418-7
YD-17
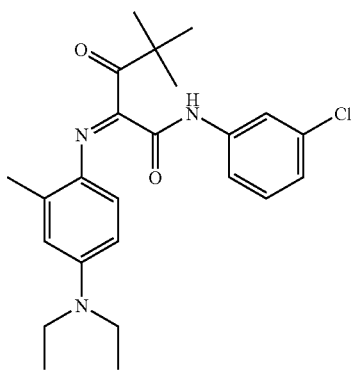
464382-4
YD-18
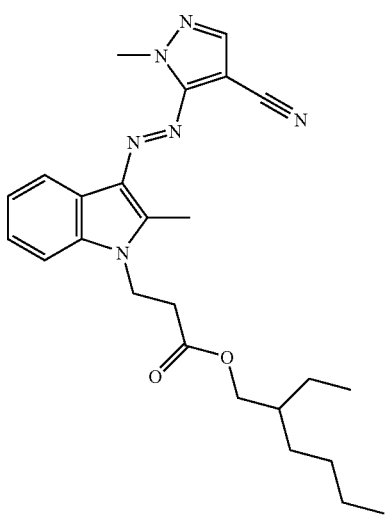
522889-4
YD-19
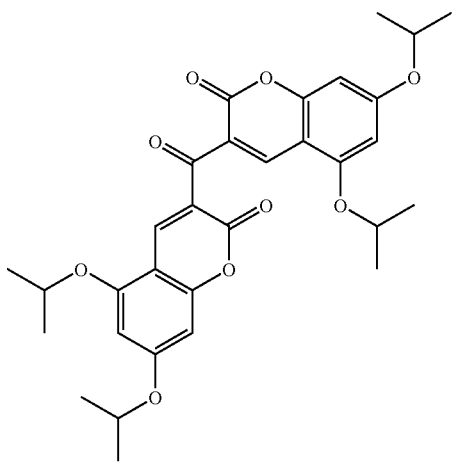

536698-0
YD-20
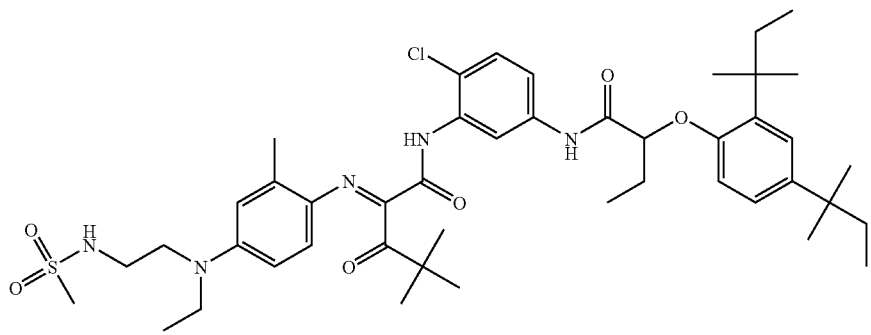
539627-7
YD-21
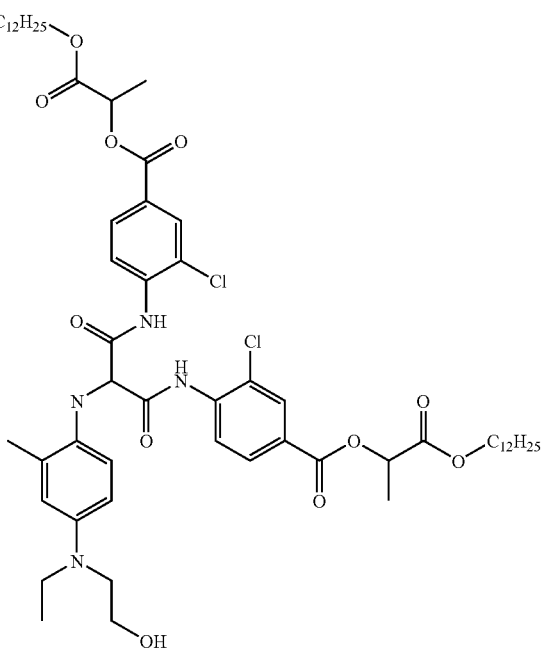
548824-1
YD-22
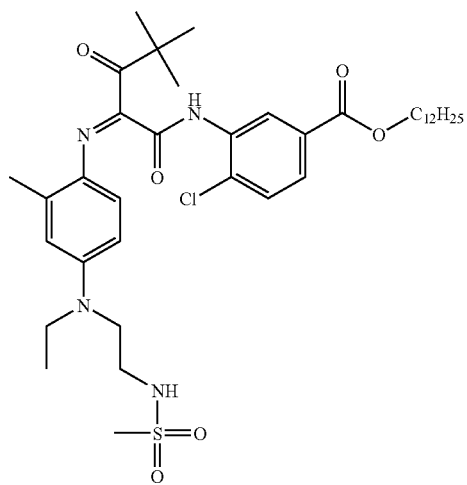

-continued
554672-2
YD-23
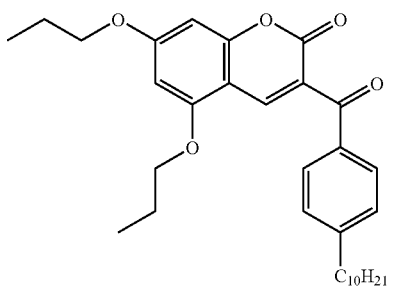
675151-0
YD-24
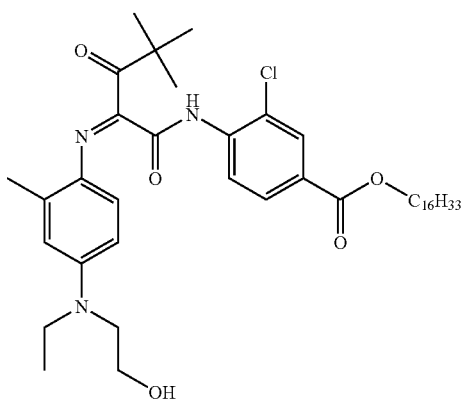
CD-1
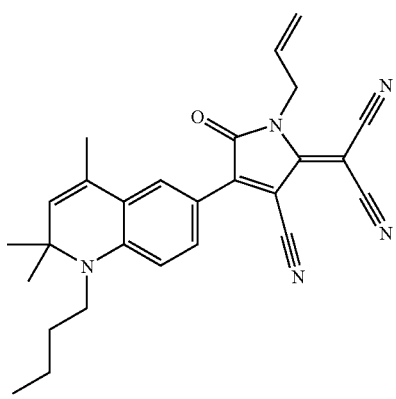
CD-2
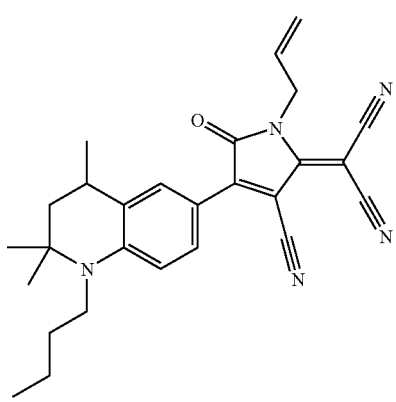

-continued
CD-3
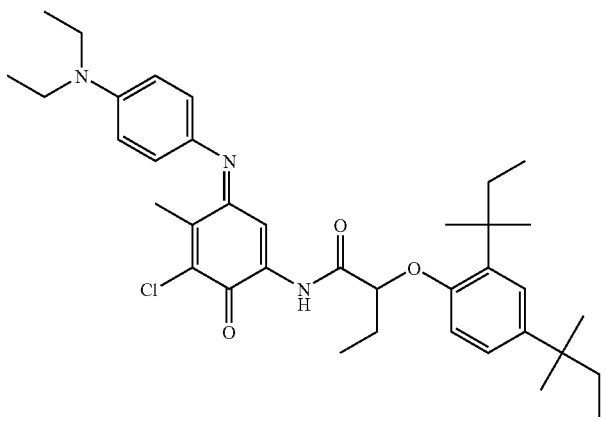
CD-4
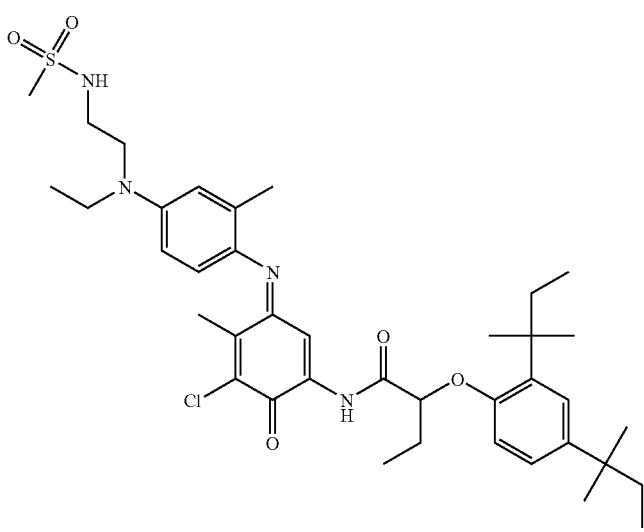
MD-1
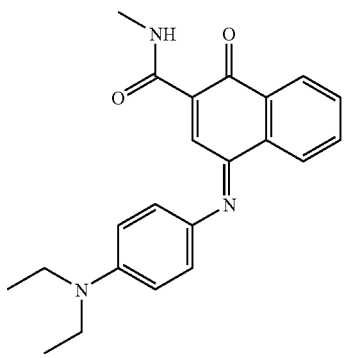
MD-2
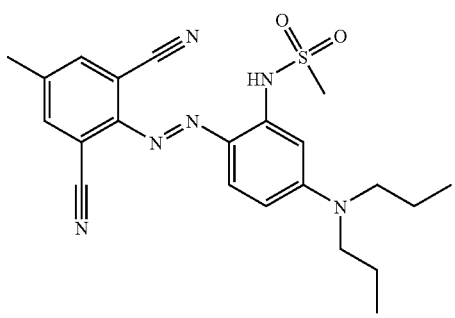

-continued
MD-3
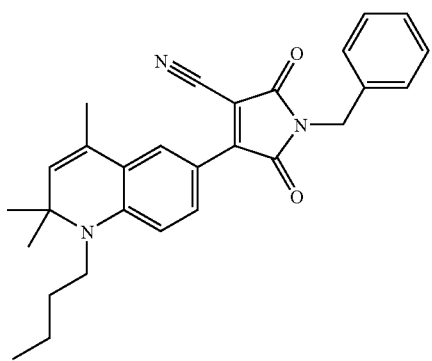
MD-4
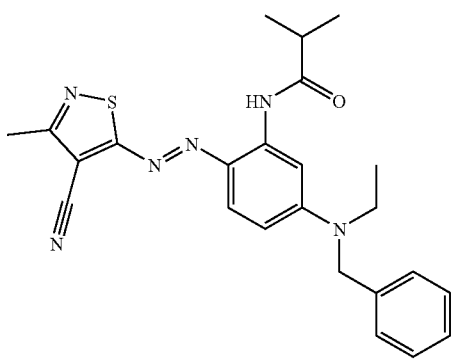
MD-5
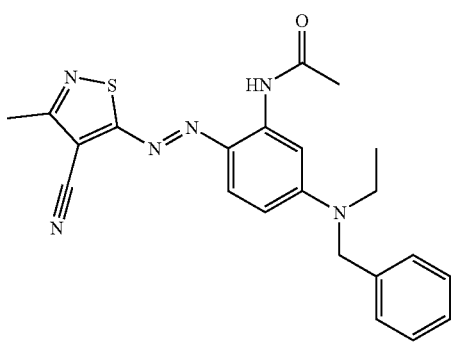
MD-6
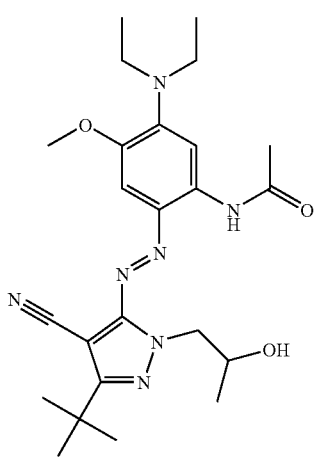

-continued
MD-7
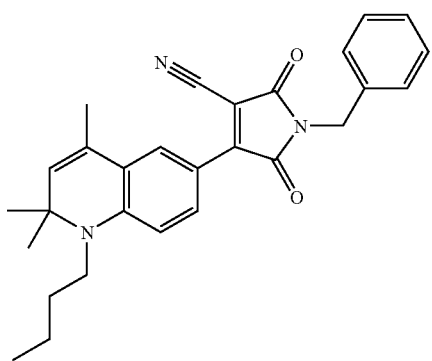
MD-8
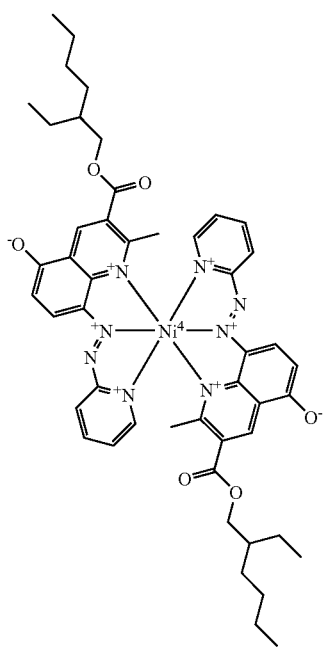
MD-9
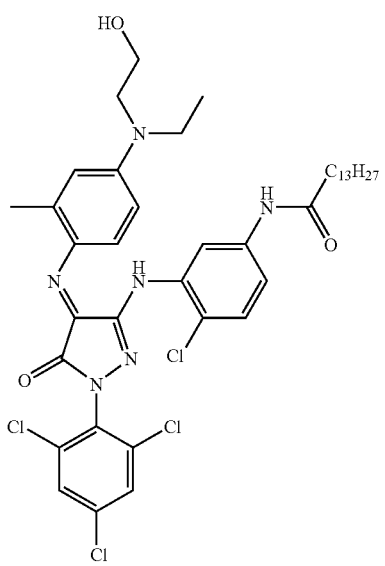

The liquid crystalline droplets or domains may be formed by any method, known to those of skill in the art, which will allow control of the domain size. For example, Doane et al. (Applied Physics Letters, 48, 269 (1986)) disclose a PDLC made via a phase separation method in which a solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments and do not tend to allow as much control of domain sizes as desired.

Liquid crystal domains are preferably made using a limited coalescence methodology, as disclosed in U.S. Pat. Nos. 6,556,262 and 6,423,368, incorporated herein by reference. A PDLC based on the cholesteric liquid crystal material containing one or more absorber colorants is prepared by first preparing an oil-in-water type emulsion of the cholesteric liquid crystal material by the process of limited coalescence also known as the Pickering emulsion process. The emulsion is then mixed with a suitable binder and coated on a conductive support.

In the limited coalescence process, the droplet-water interface is stabilized by particulate species. A promoter may be used to anchor the particulate species to the droplet-water interface. Surface stabilization by particulate species is particularly preferred as it can give narrow size distribution and the size of the droplets can be controlled by the concentration of the particulate species employed. The distribution of droplet sizes in the coating is such that the coefficient of variation (cv) defined as the ratio of the standard deviation of the distribution divided by the arithmetic mean is less than 0.35, preferably less than 0.3 and most preferably less than 0.25. A minimum thickness of the droplets, preferably of at least 4 microns, is desired for obtaining maximum reflectance. A very broad distribution of droplet sizes may result in a significant fraction of droplets having thickness less than the minimum resulting in a loss in performance. The limited coalescence process is described more fully by Whitesides and Ross (J. Colloid Interface Sci. 169, 48 (1995)), by Giermanska-Kahn, Schmitt, Binks and Leal-Calderon (Langmuir, 18, 2515 (2002)), and U.S Pat. No. 6,556,262, all incorporated herein by reference.

The particulate species may be composed of inorganic materials such as, metal salt or hydroxides or oxides or clays, organic materials such as sulfonated crosslinked organic homopolymers and resinous polymers as described, for example, in U.S. Pat. No. 2,932,629; silica as described in U.S. Pat. No. 4,833,060; copolymers such as copoly (styrene-2-hydroxyethyl methacrylate-methacrylic acid-ethylene glycol dimethacrylate) as described in U.S. Pat. No. 4,965,131, all of which are incorporated herein by reference. The particulate species is typically in the size range of 5 nm to 100 nm; preferably 5 nm to 25 nm. The preferred material for the particulate species is finely divided silica such as Ludox from DuPont Corporation.

Suitable promoters to anchor the particulate species to the interface of the colored cholesteric liquid crystal droplets and the aqueous or matrix phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is a copolymer of methylaminoethanol and adipic acid.

The liquid crystal material is dispersed in a continuous binder. Suitable hydrophilic binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Useful "gelatins," as that term is used generically herein, include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water soluble polyvinyl compounds such as polyvinyl alcohol, polyacrylamide, poly(vinylpyrrolidone), and the like.

Other organic binders such as polyvinyl alcohol (PVA) or polyethylene oxide (PEO) can be used as minor components of the binder in addition to gelatin. Such compounds are preferably machine coatable on equipment associated with photographic films. A conventional surfactant can be added to the emulsion to improve adhesion to first conductors 20. Surfactants can be of conventional design, and are provided at a concentration that corresponds to the critical micelle concentration (CMC) of the solution. A preferred surfactant is a mixture of the sodium salts of di-isopropyl and tri-isopropyl naphthalene sulfonate, commercially available from DuPont, Inc. (Wilmington, Del.) as ALKANOL XC surfactant.

In one embodiment, a liquid crystal material is dispersed an aqueous bath containing a water soluble binder material such as deionized gelatin, polyvinyl alcohol (PVA) or polyethylene oxide (PEO). Such compounds are machine coatable on equipment associated with photographic films. It is desirable that the binder have a low ionic content. The presence of ions in such a binder hinders the development of an electrical field across the dispersed liquid crystal material. Additionally, ions in the binder can migrate in the presence of an electrical field, chemically damaging the light modulating layer. The liquid crystal and gelatin emulsion are coated to a thickness of between 5 and 30 microns to optimize optical properties of light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

In order to prevent the hydrophilic colloid from removing the suspension stabilizing agent from the surface of the cholesteric liquid crystal droplets, suitable anionic surfactants may be included in the mixing step to prepare the coating composition such as polyisopropyl naphthalenesodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

A polymer dispersed cholesteric layer 30 overlays first conductors 20. Polymer dispersed cholesteric layer 30 includes a polymeric dispersed cholesteric liquid crystal material. Application of electrical fields of various intensity and duration can drive a chiral nematic material (cholesteric) into a reflective state, to a transmissive state, or an intermediate state. These materials have the advantage of maintaining a given state indefinitely after the field is removed. Cholesteric liquid crystal materials can be MERCK BL112, BL118 or BL126, available from E.M. Industries of Hawthorne, N.Y.

In a preferred embodiment, polymer dispersed cholesteric layer 30 is E.M. Industries' cholesteric material BL-118 dispersed in deionized photographic gelatin to form an emulsion. The emulsion can be dueled with an aqueous hardener solution to create a material resistant to humidity and temperature variations when used the display. The addition of a bacteriostat prevents gelatin degradation during emulsion storage and during material operation. The gelatin concentration in the emulsion when coated is preferably between about 2 and 20 weight percent based on the weight of the emulsion. In the final emulsion, in this embodiment, the liquid crystal material is dispersed at 8% concentration in a 5% deionized gelatin aqueous solution. The mixture is dispersed to provide domains having an average diameter of 5 to 30 microns, preferably 8 to 15 microns, which domains of liquid crystal are dispersed in an aqueous suspension. (These size ranges also apply to the dried coating.)

The contrast of the display is degraded if there is more than a substantial monolayer of cholesteric liquid crystal domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 5 to 30 microns. The imaging layer preferably has a thickness of 10 to 150 microns when first coated and 6 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermo-plastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 3000–350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl(x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, can also be used. Alternatively, the substrate 15 may be thin, transparent glass.

The liquid crystal display contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium tin oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO, which is polycrystalline. The ITO layer is preferably 10–120 nm in thickness, or 50–100 nm thick to achieve a resistivity of 20–60 ohms/square on plastic. An exemplary preferred ITO layer is 60–80 nm thick.

At least one of the conductive layer or layers is preferably patterned, desirably to produce an addressable matrix which results in a displayed image. The conductive layer is preferably patterned into a plurality of electrodes. The patterned electrodes may be used to form a liquid crystal display. In another embodiment, two conductive substrates are positioned facing each other and chiral nematic liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17–22, 1998, no. VOL. 29, May 17, 1998, pages 1099–1101, both incorporated herein by reference.

The liquid crystal display may also comprises at least one "functional layer" between the conductive layer and the substrate. The functional layer may comprise a protective layer or a barrier layer. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate In another embodiment, the polymeric support may further comprise an antistatic layer to manage unwanted charge build up on the sheet or web during roll conveyance or sheet finishing. Since the liquid crystal material is switched between states by voltage, charge accumulation of sufficient voltage on the web surface may create an electrical field that when discharged may switch a portion of the liquid crystal. It is well know in the art of photographic web based materials that winding, conveying, slitting, chopping and finishing can cause charge build on many web based substrates. High charge buildup is a particular problem with plastic webs that are conductive on one side but not on the other side. Charges accumulates on one side on the web to the point of discharge and in photographic light sensitive materials that discharge can result in fog which is uncontrolled light exposure as a result of the spark caused from the discharge. Similar precaution and static management is necessary during manufacturing or in end use applications for liquid crystal displays. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

One type of functional layer may be a color contrast layer. Color contrast layers may be radiation reflective layers or radiation absorbing layers. In some cases, the rearmost substrate of each display may preferably be painted black. The black paint absorbs infrared radiation that reaches the back of the display. In the case of the stacked cell display, the contrast may be improved by painting the back substrate of the last visible cell black. The paint is preferably transparent to infrared radiation. This effectively provides the visible cell with a black background that improves its contrast, and yet, does not alter the viewing characteristics of the infrared display. Paint such as black paint, which is transparent in the infrared region, is known to those skilled in the art. For example, many types of black paint used to print the letters on computer keys are transparent to infrared radiation. In one embodiment, a light absorber may be positioned on the side opposing the incident light. In the fully evolved focal conic state, the chiral nematic liquid crystal is very weakly scattering, passing the majority of incident light, which is absorbed by the light absorber to create a black image. Progressive evolution of the focal conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light modulating layer maintains a given optical state indefinitely. This process is more fully discussed in U.S. Pat. No. 5,437,811, incorporated herein by reference.

The color contrast layer may also be other colors. In another embodiment, the dark layer comprises milled non-conductive pigments. The materials are milled below 1 micron to form "nano-pigments". Such pigments are effective in absorbing wavelengths of light in very thin or "sub micron" layers. In a preferred embodiment, the dark layer absorbs all wavelengths of light across the visible light spectrum, that is from 400 nanometers to 700 nanometers wavelength. The dark layer may also contain a set or multiple pigment dispersions. For example, three different pigments, such as a Yellow pigment milled to median diameter of 120 nanometers, a magenta pigment milled to a median diameter of 210 nanometers, and a cyan pigment, such as Sunfast® Blue Pigment 15:4 pigment, milled to a median diameter of 110 nanometers are combined. A mixture of these three pigments produces a uniform light absorption across the visible spectrum. Suitable pigments are readily available and are designed to be light absorbing across the visible spectrum. In addition, suitable pigments are inert and do not carry electrical fields.

Suitable pigments used in the color contrast layer may be any colored materials, which are practically insoluble in the medium in which they are incorporated. The preferred pigments are organic in which carbon is bonded to hydrogen atoms and at least one other element such as nitrogen, oxygen and/or transition metals. The hue of the organic pigment is primarily defined by the presence of one or more chromophores, a system of conjugated double bonds in the molecule, which is responsible for the absorption of visible light. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine, triarylcarbonium and quinophthalone.

The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants.

The following examples are provided to illustrate the invention.

EXAMPLE 1

Control

Figure 3:
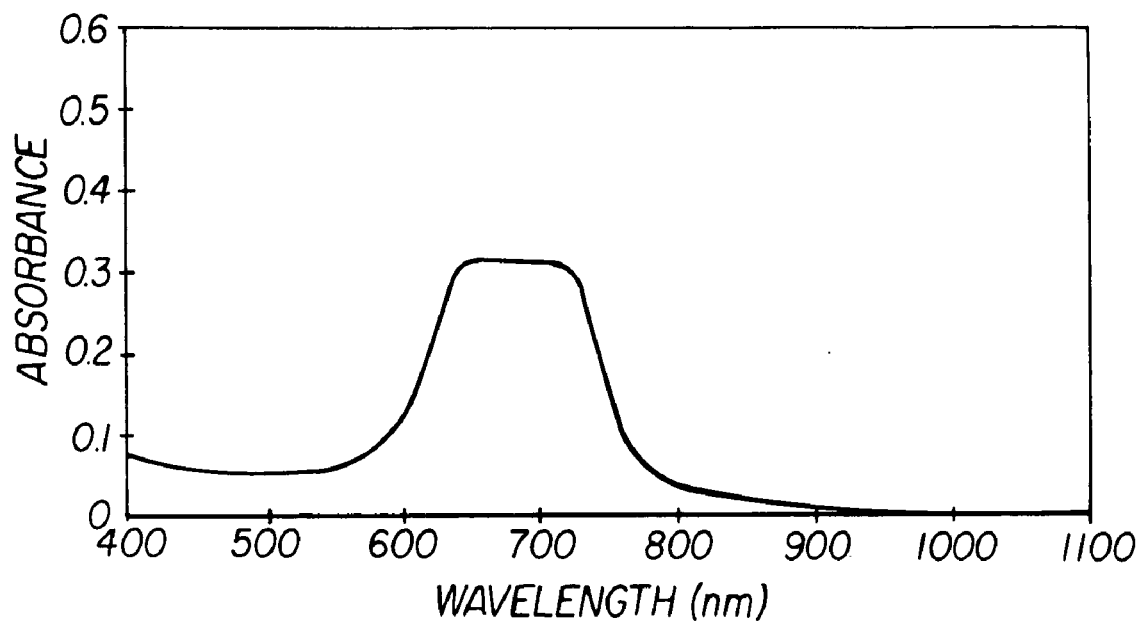
FIG. 3 shows the spectrum of a chiral nematic formulation between glass slides.

This example illustrates the effect of the shape of the coated droplet on the spectrum of a chiral nematic liquid crystal (N*LC) formulation. FIG. 3 shows the spectrum of a red reflecting chiral nematic formulation between glass slides. The material was prepared by adding the appropriate amount of a high twist chiral dopant to the nematic host mixture BL087 obtained from Merck, Darmstadt, Germany. Although the y-axis of FIG. 3 says 'absorbance', it should be noted that there is no light absorption by these materials. At the reflecting wavelength, theoretically half the incident light is reflected and the other half is transmitted. Therefore, the spectrophotometer should measure an "absorbance" of 0.3 where "absorbance" is simply $\log_{10}$ (1/T); T being the transmittance of the sample. Since half the light is transmitted, T should theoretically be 0.5 and $\log_{10}$ (2) should be approximately 0.3. FIG. 3 shows that the maximum "absorbance" of the sample is indeed close to 0.3.

A dispersion of the chiral nematic composition was prepared as follows. To 200 grams of distilled water was added 3.3 grams of Ludox® colloidal silica suspension and 6.9 grams of a 10% w/w aqueous solution of a copolymer of methylaminoethanol and adipic acid. To this was added 90 grams of any one of the chiral nematic compositions prepared above. The mixture was stirred using a Silverson ®mixer at 5000 rpm. It was then passed twice through a Microfluidizer® at 3000 psi. Two hundred and eighty grams of the resulting dispersion was mixed with 770 grams of an aqueous solution containing 6.8% w/w alkali treated gelatin at 50° C. The dispersion (8% w/w LC material and 5% w/w gelatin) was stored in a refrigerator until further use. Microscopic examination showed that the dispersion consisted of uniform 10 µm droplets of the LC material in an aqueous gelatin medium.

The dispersion was then knife coated onto a flexible polyethylene terephthalate (PET) surface with an 250 Å thick sputter coated indium tin oxide (ITO) layer to give a coverage of 86.1 $cm^3/m^2$ (8 $cm^3/ft^2$) for the liquid crystal material. The coatings were allowed to dry. A black nano-pigment layer was then spread over the liquid crystal layer followed by patches of conducting ink.

Figure 4:
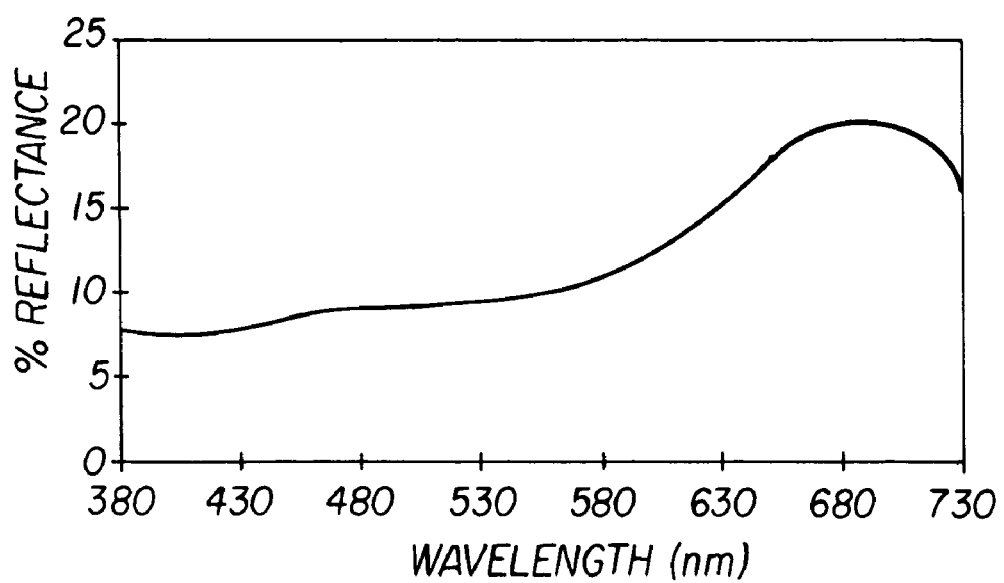
FIG. 4 shows the reflectance spectrum of the same sample coated in the form of droplets in a device.

A voltage pulse was then applied to the coating to switch it to the planar state and the reflectivity was recorded as a function of wavelength using a Spectrolino SpectoScan® reflectance spectrometer. The results are shown in FIG. 4. It is clear that the shape of the coated droplet causes a change in the spectrum compared to FIG. 3, giving rise to reflections at lower wavelengths and a loss in color purity.

A sample of the coated display device was also sent for estimation of the particle size distribution by image analysis. The coating was mounted on a glass microscope slide with a cover slip, and an oil coupling between the cover slip and a 100× objective lens. The sample was viewed using a research grade light microscope, such as an Olympus BX60, and photographs were taken using a CCD camera with color filter array at 0.74 microns per pixel resolution in the final image. The diameters of 150 particles were measured manually. The arithmetic mean and standard deviation of the distribution were calculated from these measurements. The former was found to be 12.44 microns and the latter 3.06 microns giving a coefficient of variation of 0.24.

EXAMPLE 2

Invention

A chiral nematic composition with center wavelength of reflection at 590 nm (measured with the sample between glass slides) was prepared by adding the appropriate amount of a high-twist chiral dopant to the nematic host mixture BL087 obtained from Merck, Darmstadt, Germany. A second chiral nematic composition was prepared in the same manner but also contained 0.25% of the oil soluble blue absorber dye Neopen 075 from BASF Corporation.

Dispersions of the chiral nematic compositions were prepared as follows. To 200 grams of distilled water was added 3.3 grams of Ludox® colloidal silica suspension and 6.9 grams of a 10% w/w aqueous solution of a copolymer of methylaminoethanol and adipic acid. To this was added 90 grams of any one of the chiral nematic compositions prepared above. The mixture was stirred using a Silverson ®mixer at 5000 rpm. It was then passed twice through a Microfluidizer® at 3000 psi. Two hundred and eighty grams of the resulting dispersion was mixed with 770 grams of an aqueous solution containing 6.8% w/w Type IV gelatin at 50° C. The dispersion (8% w/w liquid crystal material and 5% w/w gelatin) was stored in a refrigerator until further use. Microscopic examination showed that the dispersion consisted of uniform 10 µm droplets of the liquid crystal material in an aqueous gelatin medium.

The dispersions were then knife coated onto a flexible polyethylene terephthalate (PET) surface with an 250 Å thick sputter coated indium tin oxide (ITO) layer to give a coverage of 86.1 $cm^3/m^2$ (8 $cm^3/ft^2$) for the liquid crystal material. For 10 µm droplets, full monolayer coverage can be expected at a laydown of about 6.5 $g/m^2$ (600 $mg/ft^2$) of the liquid crystal composition or a wet coverage of 80.7 $cm^3/m^2$ (7.5 $cm^3/ft^2$) if the coating composition is made up of 8% the liquid crystal material and 5% gelatin by weight. An amount in slight excess of this will still constitute a substantial monolayer, well below a bi-layer of domains. The coatings were allowed to dry. A black nano-pigment layer was then spread over the liquid crystal layer followed by patches of conducting ink.

Figure 5:
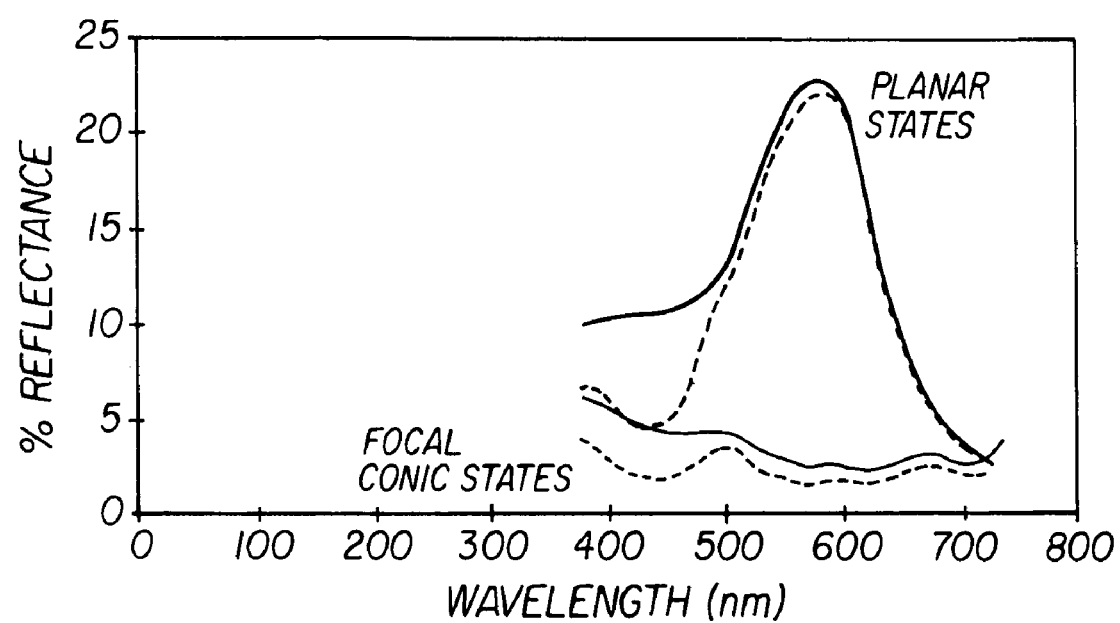
FIG. 5 illustrate the reflectivity of a sample in both the planar and focal conic states, recorded as a function of wavelength using a Spectrolino SpectoScanâ reflectance spectrometer.

Voltage pulses were applied to the coatings to switch them to the planar and focal conic states. The reflectivity in both states was recorded as a function of wavelength using a Spectrolino SpectoScan® reflectance spectrometer. The results are shown in FIG. 5. The full lines show results for the sample without the absorber dye and the dashed lines show results for the sample with absorber dye. It is clear that the presence of the absorber colorant provides a much sharper spectrum in the planar state and also minimizes back-scattering from the focal conic state. The latter is particularly evident at the lower wavelengths. The overall effect is a significant improvement in the visual appearance of the display.

The invention has been described in detail with particular reference to certain preferred embodiments thereof, but it will be understood that variations and modifications can be effected within the spirit and scope of the invention.

The invention claimed is:

1. A bistable polymer dispersed liquid crystal display comprising a support, at least one patterned conductor layer having thereon at least one dried imaging layer comprising a substantial monolayer of isolated domains of liquid crystal material dispersed in a continuous polymer matrix, wherein said dried imaging layer further comprises at least one absorber colorant, and wherein said isolated domains have a size distribution such that the coefficient of variation (cv) is less than 0.35.

2. The bistable polymer dispersed liquid crystal display of claim 1 wherein said coefficient of variation is less than 0.3.

3. The bistable polymer dispersed liquid crystal display of claim 1 wherein said coefficient of variation is less than 0.25.

4. The bistable polymer dispersed liquid crystal display of claim 1 wherein domains further have a minimum thickness of at least 4 microns.

5. The bistable polymer dispersed liquid crystal display of claim 1 wherein said domains are limited coalescence domains having a domain-continuous polymer matrix interface stabilized by particulate species.

6. The bistable polymer dispersed liquid crystal display of claim 5 wherein said particulate species has a size range of from 5 nm to 100 nm.

7. The bistable polymer dispersed liquid crystal display of claim 5 wherein said particulate species is finely divided silica.

8. The bistable polymer dispersed liquid crystal display of claim 5 wherein said particulate species is anchored to said domain-continuous polymer matrix interface by a promoter.

9. The bistable polymer dispersed liquid crystal display of claim 1 wherein said domains comprise chiral nematic liquid crystal material.

10. The bistable polymer dispersed liquid crystal display of claim 9 wherein said domains are flattened to improve reflectance in the reflecting state of said display.

11. The bistable polymer dispersed liquid crystal display of claim 9 wherein said domains have an average diameter of 5 to 30 microns when dispersed in an aqueous suspension prior to drying.

12. The bistable polymer dispersed liquid crystal display of claim 9 wherein said domains have an average diameter of from 8 to 15 microns when dispersed in an aqueous suspension prior to drying.

13. The bistable polymer dispersed liquid crystal display of claim 9 wherein said domains are flattened spheres and have on average a thickness at least 50% less than their length.

14. The bistable polymer dispersed liquid crystal display of claim 9 wherein said domains have a thickness to length ratio of 1:2 to 1:6.

15. The bistable polymer dispersed liquid crystal display of claim 9 wherein said imaging layer has a thickness of 6 to 20 microns.

16. The bistable polymer dispersed liquid crystal display of claim 1 wherein said at least one absorber colorant is an absorber dye compatible with said continuous polymeric matrix.

17. The bistable polymer dispersed liquid crystal display of claim 1 wherein said at least one absorber colorant is soluble in toluene.

18. The bistable polymer dispersed liquid crystal display of claim 17 wherein said at least one absorber colorant is soluble in toluene has a solubility greater than 1 gram absorber colorant per liter of toluene.

19. The bistable polymer dispersed liquid crystal display of claim 1 wherein said absorber colorant comprises at least one member selected from the group consisting of anthraquinone dyes, phthalocyanine dyes, methine dyes or metal complex dyes.

20. The bistable polymer dispersed liquid crystal display of claim 1 wherein absorber colorant comprises a blue absorber dye.

21. The bistable polymer dispersed liquid crystal display of claim 20 wherein said liquid crystal material is a green, yellow, orange or red reflecting liquid crystal material.

22. The bistable polymer dispersed liquid crystal display of claim 1 wherein absorber colorant comprises a mixture of green and blue absorber dye.

23. The bistable polymer dispersed liquid crystal display of claim 22 wherein said liquid crystal material is a red reflecting liquid crystal material.

24. The bistable polymer dispersed liquid crystal display of claim 1 wherein said absorber colorant comprises a green absorber dye.

25. The bistable polymer dispersed liquid crystal display of claim 24 wherein said liquid crystal material is a blue or red reflecting liquid crystal material.

26. The bistable polymer dispersed liquid crystal display of claim 1 wherein said absorber colorant comprises a red absorber dye.

27. The bistable polymer dispersed liquid crystal display of claim 26 wherein said liquid crystal material is a blue or green reflecting liquid crystal material.

28. The bistable polymer dispersed liquid crystal display of claim 1 wherein said absorber colorant absorbs in a wavelength range of from 350 to 450 nm.

29. The bistable polymer dispersed liquid crystal display of claim 1 wherein said continuous matrix comprises gelatin.

30. The bistable polymer dispersed liquid crystal display of claim 1 wherein said at least one conductor is patterned to produce an addressable matrix.

31. The bistable polymer dispersed liquid crystal display of claim 1 wherein said at least one conductor is patterned ITO.

32. The bistable polymer dispersed liquid crystal display of claim 1 wherein said at least one conductor is transparent.

33. The bistable polymer dispersed liquid crystal display of claim 1 wherein said at least one conductor comprises a first conductor and a second conductor, wherein said imaging layer is positioned therebetween.

34. The bistable polymer dispersed liquid crystal display of claim 33 wherein said first and said second conductors are patterned to produce an addressable matrix.

35. The bistable polymer dispersed liquid crystal display sheet of claim 33 wherein said first transparent conductor is patterned ITO.

36. The bistable polymer dispersed liquid crystal display sheet of claim 1 wherein said substrate is a flexible plastic material.

37. The bistable polymer dispersed liquid crystal display sheet of claim 36 wherein said flexible plastic material is transparent.

38. The bistable polymer dispersed liquid crystal display of claim 1 further comprising a radiation absorbing layer.

* * * * *